FREDERICK H. SMITH.

MANUFACTURE OF COLUMNS, AND TUBES.

112084

Patented Feb 21 1871

United States Patent Office.

FREDERICK H. SMITH, OF BALTIMORE, MARYLAND.

Letters Patent No. 112,084, dated February 21, 1871.

IMPROVEMENT IN THE MANUFACTURE OF METAL TUBES AND COLUMNS.

The Schedule referred to in these Letters Patent and making part of the same.

*To whom it may concern:*

Be it known that I, FREDERICK H. SMITH, of the city and county of Baltimore and State of Maryland, have invented certain new and useful Improvements in the Manufacture of Columns and Tubes, of which the following is a specification.

The object of this invention is to produce a solid rolled column or tube of iron or other malleable metal from one piece or sheet, or from two or more properly-curved or shaped longitudinal segments or bars, which, when put together, will constitute a column of the desired shape and conformation.

The invention consists in the manufacture or production of such solid rolled metallic column by passing the piece, or the segments which compose the column, properly shaped and put together, between pressure-rolls, and bringing the contiguous edges of said piece or segments to a welding heat by blow-pipe, or gas-jets, or other suitable heating devices, applied to or playing in or upon the seams or joints in advance of and also at the immediate point of application of the roll-pressure, whereby, as the edges soften under the heat, the seams will close the more tightly, and the contiguous edges will finally be welded together under the roll-pressure.

In the accompanying drawing I have represented the manner in which my invention is or may be carried into effect.

Figure 1:
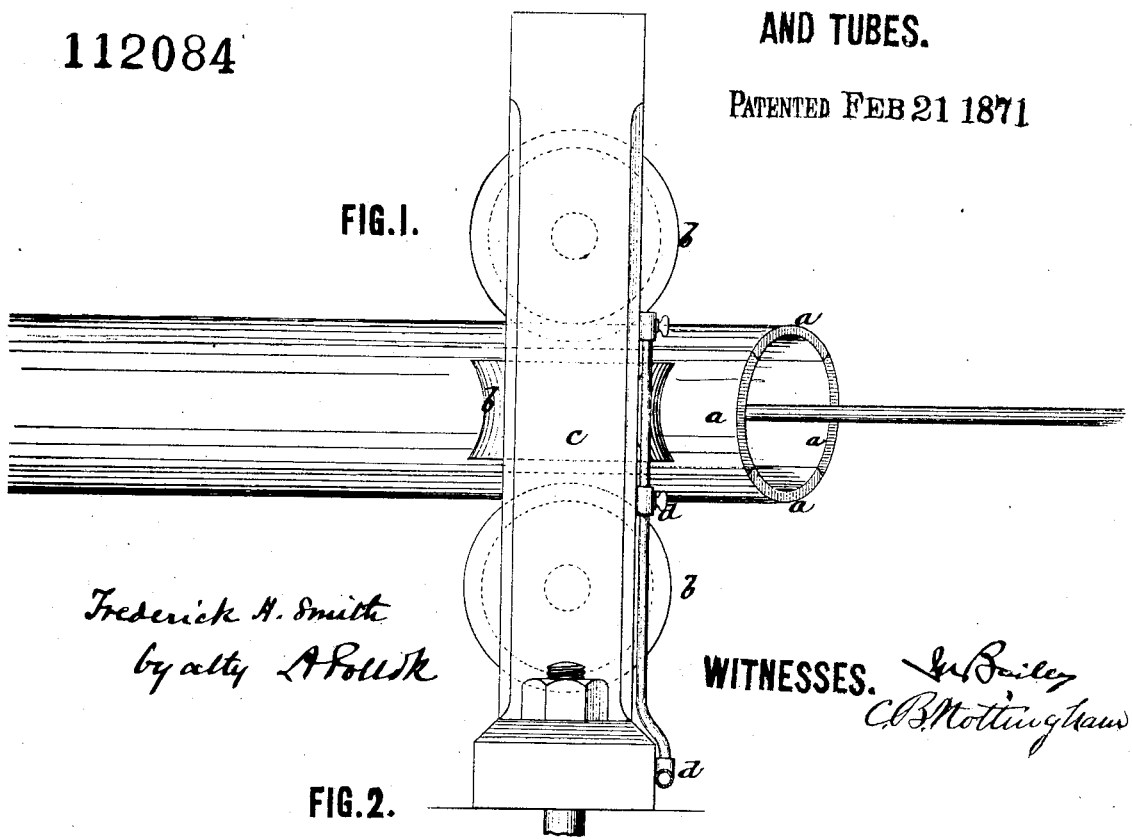
Figure 1 is a side elevation of an apparatus adapted to form the column by the application of welding heat and pressure to the segments of the column.
Figure 2:
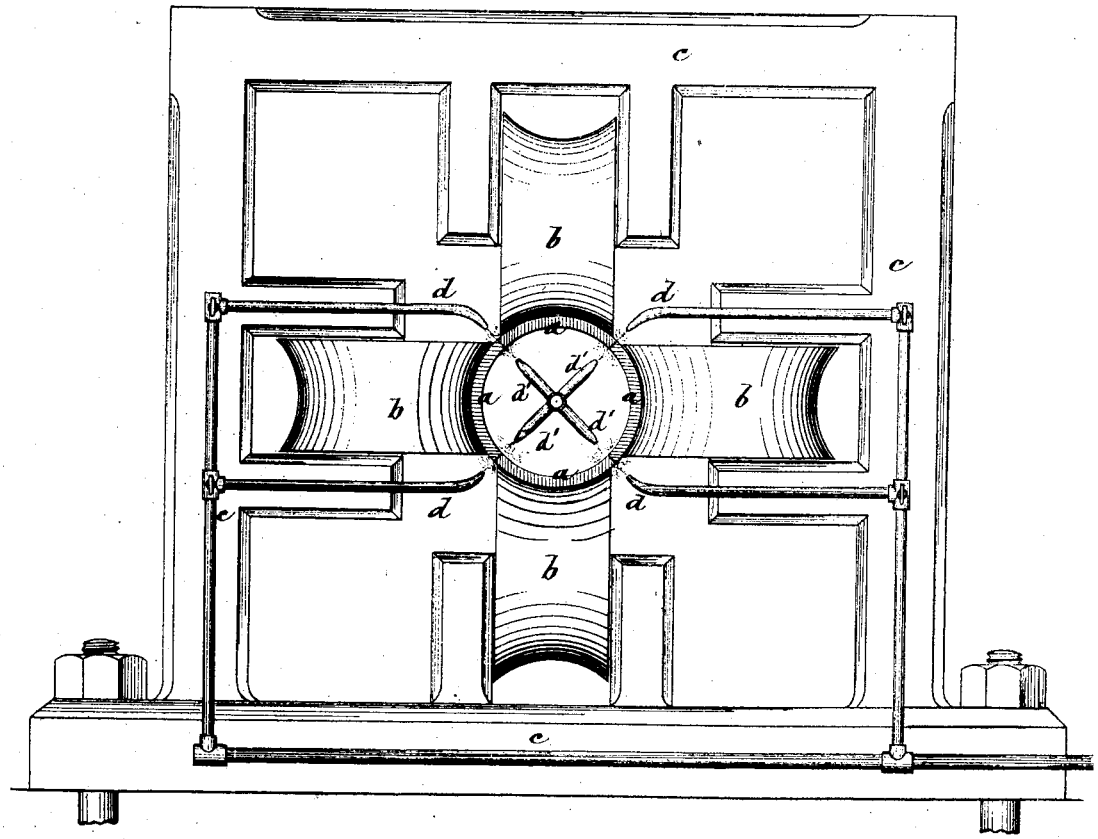
Figure 2 is a front elevation of the same.

The column or tube may be made of rolled iron, steel, copper, or other malleable metal, and may have any suitable or desired shape in cross-section, and may be formed of one piece, or of two or more longitudinal bars or segments.

In the present instance I have represented a cylindrical, tubular column, composed of four segments, *a*.

In order to unite these segments so as to produce a solid column, I make use of a series of pressure-rolls, *b*, arranged in a suitable frame-work, *c*, so as to grasp and press the column on all sides, the peripheries of the rollers being shaped to conform with the shape of the respective segments with which they are to be brought in contact.

In advance of the point where the column enters between the rolls are placed gas or blow-pipe jets, *d*, or other devices, so arranged as to heat from one to ten inches approximately in length of the seams just before such heated portion passes to the rolls.

The gas employed for heating may be of any suitable composition, such, for instance, as the oxyhydrogen flame, &c.

The intensity of the heat used will, of course, determine the speed at which the column should pass through the rolls.

The jets or other heating devices are arranged so that one or more shall be opposite each seam or joint; and they may be placed externally, as shown at *d*, or internally, as shown at *d'*, or both externally and internally.

The feed of the column between the rolls may be caused by the pressure-rolls themselves, which, in such case, would receive a positive motion from some suitable source, or by other and distinct feeding devices.

When the segments *a* are placed together prior to their passage between the rolls, they are, of course, a little separated from one another, as a close joint cannot be made with ordinary rolled-edge iron. But, when they are passing through the rolls, with the gas-jets playing upon the joints, the seams close tighter and tighter as the edges soften under the heat, and the pressure of the rolls comes nearer, until, finally, the segments are welded together under the roll-pressure, with the gas still playing between the rolls upon the seams at the very instant of the greatest pressure.

A welding-mixture can be used in the joints, if desired.

If it should happen that the pressure of the rolls causes the joints, in some instances, to be displaced, a supporting-disk or mandrel, or other suitable means, may be arranged within the column, so as to support it at the point of roll pressure. Or flanges may be formed, either inside or outside, upon the segments, at their edges, so as to thicken up and strengthen the joints in thin columns, and also to steady the segments in the grasp of the rolls. Or it may be found desirable to roll the segments with beveled or tongued and grooved edges, to prevent them from slipping while welding.

As above intimated, the column can be made, if desired, of but one piece or strip, which, having been bent into cylindrical or other shape by suitable means, is made into a solid column by the process of uniting its contiguous edges, as before described.

The machine can be made adjustable, so that, by changing the rolls in the frame or housing *c*, any size or shape of column may be produced.

In case the segments are of such form as to make the completed column larger in the middle than at the ends, or *vice versa*, as is more frequently the case in square columns, the rolls should have imparted to them, by suitable means, an opening-and-closing motion, so as to conform to the varying sectional area of the column.

It will be, of course, understood that the columns can be made round, square, or any other form of section.

Having now described my invention, and the manner in which the same is, or may be carried into effect,

What I claim, and desire to secure by Letters Patent, is—

The manufacture of metallic columns and tubes, substantially in the manner herein shown and described.

In testimony whereof I have signed my name to this specification before two subscribing witnesses.

FREDERICK H. SMITH.

Witnesses:
 NEWTON M. GRAY,
 MICHAEL H. CARROLL.